3 Sheets—Sheet 1.
T. D. GERE.
Grain-Drill.
No. 208,388. Patented Sept. 24, 1878.
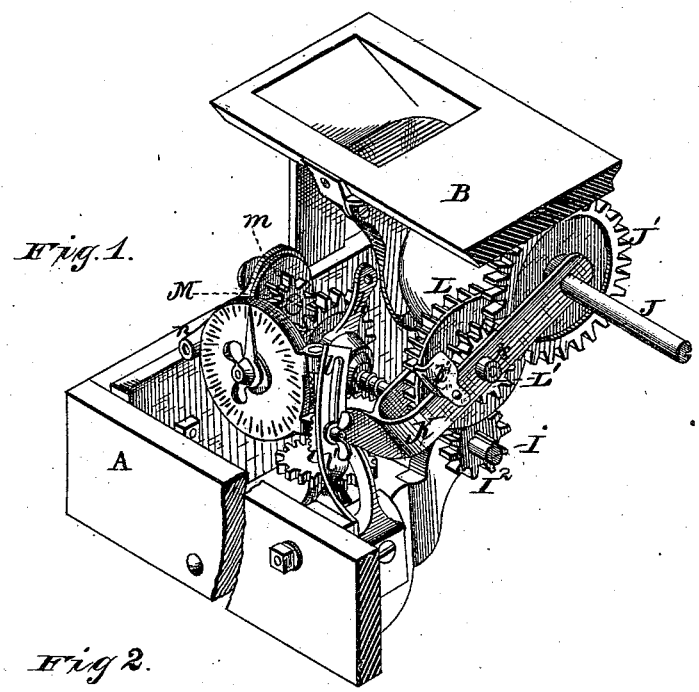
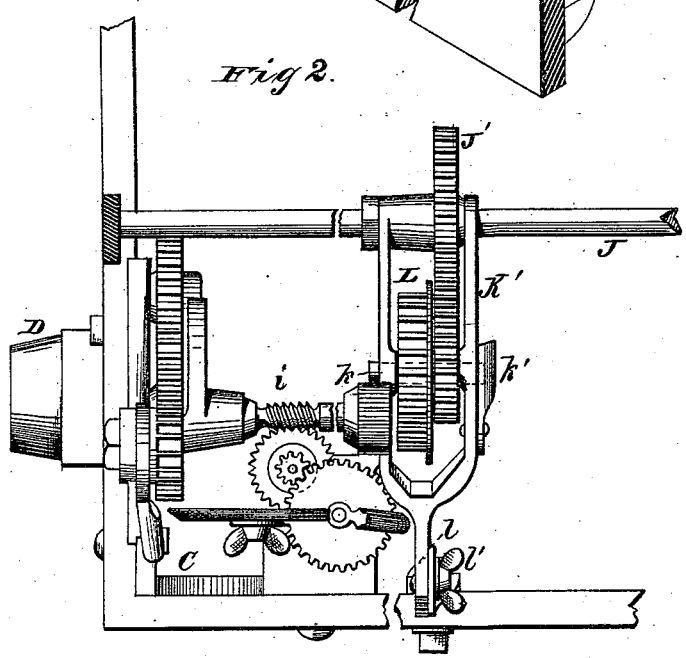
WITNESSES
Alexander Mahon
John G. Center
BY
INVENTOR
Theodore D. Gere
by A. M. Smith
ATTORNEY 3 Sheets—Sheet 2

T. D. GERE.
Grain-Drill.

No. 208,388. Patented Sept. 24, 1878.

WITNESSES
Alexander Mahon
John G. Center

INVENTOR
Theodore D. Gere
by A. M. Smith
ATTORNEY

3 Sheets—Sheet 3.
T. D. GERE.
Grain-Drill.
No. 208,388. Patented Sept. 24, 1878.
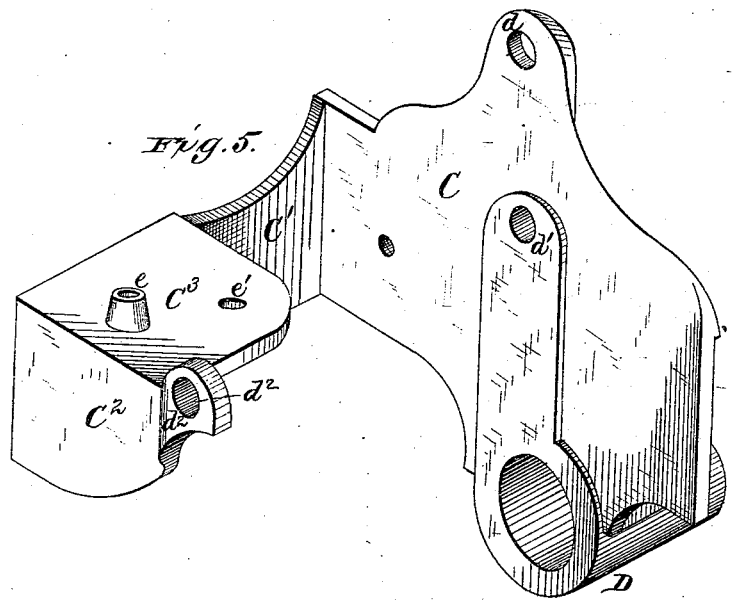
WITNESSES
Alexander Mahin
John C. Center
INVENTOR
Theodore D. Gere
by A. M. Smith
ATTORNEY

UNITED STATES PATENT OFFICE.

THEODORE D. GERE, OF OWEGO, NEW YORK.

IMPROVEMENT IN GRAIN-DRILLS.

Specification forming part of Letters Patent No. 208,388, dated September 24, 1878; application filed July 31, 1878.

*To all whom it may concern:*

Be it known that I, THEODORE D. GERE, of Owego, county of Tioga, State of New York, have invented certain new and useful Improvements in Grain-Drills, of which the following is a full, clear, and exact description, reference being had to the accompanying drawings, making part of this specification, in which—

Figure 3:
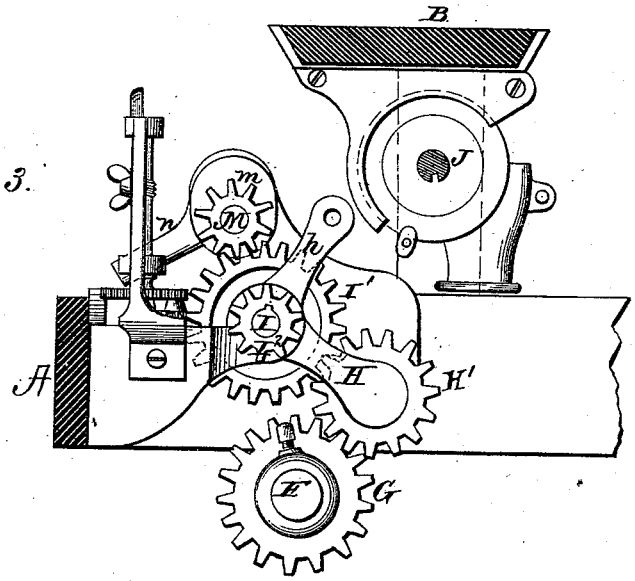
Figure 4:
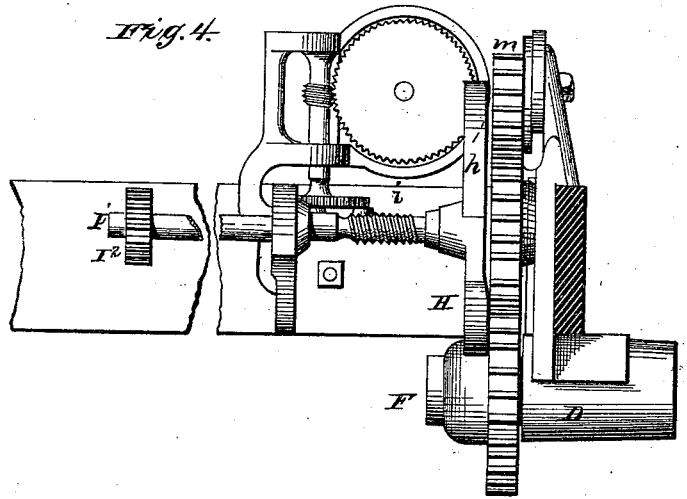

Figure 1 represents a perspective view of a part of a grain-drill frame with my improvements applied. Fig. 2 is a plan view of the same with the grain-box removed. Fig. 3 is a side elevation, partly in section, showing the arrangement of a portion of the driving-gearing; and Fig. 4 is a rear elevation of the same. Fig. 5 is a perspective view of the gear and brace-plate detached.

Similar letters of reference denote corresponding parts wherever used.

My invention relates to a novel arrangement of means for changing the feed, and to the arrangement of and means for supporting the driving mechanism, &c., as hereinafter fully described.

In the accompanying drawings, A represents a portion of the main frame, which may be of any usual or preferred construction, and B the bottom of the grain-box, supported thereon in any usual manner.

C (see Fig. 5) is an angular casting, firmly bolted in one angle of the main frame, and forming a strong stiffening-brace thereto. This casting is provided at its side with a sleeve, D, forming the journal-box for the driving ground-wheel axle, and with sleeve or eye bearings at $d\ d^1$ for the shafts, through which motion is communicated to the grain and grass seeding devices.

The front transverse arm, $C^1$, is provided at its inner end with an angular return-arm, the vertical portion $C^2$ of which has an eye-bearing, $d^2$, for a shaft, hereinafter described, through which motion is imparted to the feeding devices, the horizontal plate $C^3$ of said arm being provided at $e\ e'$ with bearings for the shafts of the registering apparatus, hereinafter described.

F is the main drive-wheel axle, mounted and rotating in the bearing-sleeve D of plate C, and provided at its inner end, or at a point inside of the longitudinal frame-bar A, with a spur wheel or pinion, G, from which motion is communicated through a transmitting-pinion, H', to a pinion, $I^1$, keyed to and rotating a transverse shaft, I.

The transmitting-pinion H' is mounted upon a pin or stub-shaft formed upon an elbow-lever, H, which is provided at its elbow with a sleeve, journaled on the shaft I, the arrangement being such that, while the pinion H' remains always in gear with the pinion $I^1$ on said shaft, it may, by vibration of the lever, be readily thrown into or out of mesh with its driving-gear G.

The upright arm $h$ of lever H, in practice, is connected by a rod with the lifting-roller in such manner that when the hoes or drill-teeth are in operative position in the ground the pinion H' will be engaged with its driving-pinion G, and, when said hoes are lifted out of the ground, the pinion H' will be thrown out of gear.

The shaft I is mounted in the bearings $d^1\ d^2$ in the casting C, above described, and at its opposite end is feathered to receive any one of a series of different-sized pinions, $I^2$, through which motion is imparted to the distributer-wheel shaft J as follows: The shaft J is provided at any convenient point, preferably at the side of the frame opposite to the casting C, with a driving spur-gear, J'. (See Figs. 1 and 2.) This wheel is placed within or adjacent to a yoke, K, secured to and made adjustable upon or around the shaft J as a center, the outer swinging end of said yoke being connected with and made adjustable upon a curved slotted standard, $l$, by means of a set-screw or thumb-nut, $l'$. The yoke K is provided midway of its length with bearings for a short-shouldered shaft, $k$, adapted to be readily removed for effecting a change or renewal of gears, and held in place by a pivoted weighted button or cap-plate, $k'$.

L is a flanged wheel mounted on the shaft $k$, and provided on one side of the flange with a spur-wheel, which engages with and receives motion from the removable pinion $I^2$, and upon the other side with a spur-wheel, L', which engages with and imparts motion to the wheel J', and through said wheel to the distributer-wheel shaft.

The flange of wheel L, it will be seen, drops down outside of the removable pinion I² on the end of shaft I, and serves to hold said pinion in place on said shaft, while by simply raising the yoke K until the pinion I² is clear of the flange said pinion may be withdrawn over the end of the shaft I, and another pinion of different size may be substituted therefor for varying the speed of the distributer-wheel shaft as desired.

M is a short shaft secured in the bearing socket or eye $d$ in the gear-plate C, and provided at its inner end with a spur-pinion, $m$, rotating freely on said shaft, and engaging with and receiving motion from the spur-wheel I¹ on shaft I. The face of this wheel M, adjacent to the gear-plate C, is provided with an eccentric sleeve or hub, through which motion is imparted to a reversible eccentric rod or pitman, $n$, from which, through any suitable arrangement of elbow or crank lever, motion may be communicated to the devices for agitating the grass-seed arranged in a hopper either in front or in rear of the grain-box, as preferred, or as the condition of the grain may require, the reversible pitman serving to operate said devices in either position.

The casting C, as above explained, is provided at $e\ e'$ with bearings for shafts of the mechanism for registering the quantity of land seeded, which mechanism may be similar to that in use for that purpose, being actuated by a worm at $i$ on the shaft I, as shown.

In some cases it may be found desirable to effect the change of speed by substituting other double gears having the parts of different relative size in lieu of the flanged double gear L L', the ready removal of the short shaft $k$ facilitating the change in this manner. In other cases the change can be effected, if preferred, by means of a similarly removable short shaft connected by a clutch with the end of what is now the feathered shaft I. This supplemental shaft might be made to carry all the differential gears, and by placing a feather midway of its length when the shaft is withdrawn any one of said gears can be placed upon the feather, so as to engage with and drive the flanged wheel L. In this latter construction the flange of the wheel would hold said gear in place on the feather, or a fork attached to the frame could be used for that purpose, as preferred, either plan serving to hold the gears not in use out of engagement with the flanged wheel.

Parts of the machine not particularly described may be constructed and arranged in any usual or preferred manner.

Having now described my invention, what I claim as new, and desire to secure by Letters Patent, is—

1. In a grain-drill, the wheel L, intermediate between the driving and the distributer wheel shafts, provided with the flange for holding the interchangeable pinions in place, substantially as and for the purpose set forth.

2. The flanged wheel L, in combination with the adjusting-yoke K, or its equivalent, and the removable shaft $k$, substantially as and for the purpose set forth.

3. In a grain-drill, the combination of the adjustable flanged wheel L, intermediate between the driving and distributer wheel shafts, and the removable pinion I², substantially as and for the purpose set forth.

4. The angular casting C, forming a stiffening-brace for the frame, and provided with the axle-sleeve D and bearings $d\ d^1$ and $e\ e'$ for the shafts actuating the grain and grass seeding and registering devices, substantially as described.

5. The pinion $m$, provided with the eccentric boss or hub, as described, in combination with the reversible rod or pitman $n$ for actuating the grass-seeding devices, as described.

THEODORE D. GERE.

Witnesses:
C. P. SKINNER,
C. C. ELY.